United States Patent
Vu et al.

(10) Patent No.: US 10,862,338 B2
(45) Date of Patent: Dec. 8, 2020

(54) MAGNETIC FIELD FORMATION DEVICE, AND POWER RECEIVING DEVICE

(71) Applicant: NITTO DENKO CORPORATION, Ibaraki (JP)

(72) Inventors: Nam Tung Vu, Ibaraki (JP); Takezo Hatanaka, Ibaraki (JP); Taiki Sueyoshi, Ibaraki (JP); Masami Inoue, Ibaraki (JP); Hisashi Tsuda, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 77 days.

(21) Appl. No.: 16/073,410

(22) PCT Filed: Jan. 26, 2017

(86) PCT No.: PCT/JP2017/002632
§ 371 (c)(1),
(2) Date: Jul. 27, 2018

(87) PCT Pub. No.: WO2017/131063
PCT Pub. Date: Aug. 3, 2017

(65) Prior Publication Data
US 2019/0044384 A1 Feb. 7, 2019

(30) Foreign Application Priority Data

Jan. 27, 2016 (JP) .................. 2016-013190

(51) Int. Cl.
*H01F 38/14* (2006.01)
*H02J 50/12* (2016.01)
*H02J 50/40* (2016.01)
*H02J 50/50* (2016.01)
*H02J 7/02* (2016.01)

(52) U.S. Cl.
CPC .............. *H02J 50/12* (2016.02); *H01F 38/14* (2013.01); *H02J 50/40* (2016.02); *H02J 50/50* (2016.02); *H02J 7/025* (2013.01)

(58) Field of Classification Search
USPC ........................................................ 307/104
See application file for complete search history.

(56) References Cited

U.S. PATENT DOCUMENTS

| 2010/0201189 A1 | 8/2010 | Kirby et al. |
| 2011/0163714 A1 | 7/2011 | Ettes et al. |

(Continued)

FOREIGN PATENT DOCUMENTS

| JP | 2012-502610 A | 1/2012 |
| JP | 2012-517795 A | 8/2012 |

(Continued)

OTHER PUBLICATIONS

Jul. 31, 2018 International Preliminary Report on Patentability issued in International Patent Application No. PCT/JP2017/002632.

(Continued)

*Primary Examiner* — Rexford N Barnie
*Assistant Examiner* — Xuan Ly
(74) *Attorney, Agent, or Firm* — Oliff PLC

(57) ABSTRACT

A magnetic field is formed at a predetermined region. A magnetic field formation device configured to generate a variable magnetic field at a predetermined region includes power supplying resonators. All of the power supplying resonators are provided so that coil surfaces oppose the predetermined region, and at least one of the power supplying resonators is provided to have a coil surface direction intersecting with the coil surface direction of the other one of the power supplying resonators.

18 Claims, 11 Drawing Sheets

(56) References Cited

U.S. PATENT DOCUMENTS

| | | | |
|---|---|---|---|
| 2012/0256492 A1* | 10/2012 | Song .................. | H02J 7/025 307/66 |
| 2014/0292100 A1* | 10/2014 | Lee .................... | H01F 38/14 307/104 |
| 2014/0312705 A1 | 10/2014 | Hatanaka et al. | |
| 2015/0210170 A1* | 7/2015 | Oyobe .............. | B60L 53/122 320/108 |
| 2015/0222148 A1 | 8/2015 | Sampei et al. | |
| 2015/0341085 A1* | 11/2015 | Ettes ................ | H04B 5/0031 307/104 |

FOREIGN PATENT DOCUMENTS

| | | |
|---|---|---|
| JP | 2013-240260 A | 11/2013 |
| JP | 2015-039271 A | 2/2015 |
| JP | 2015-144508 A | 8/2015 |

OTHER PUBLICATIONS

May 23, 2019 Extended European Search Report issued in European Patent Application No. 17744293.6.

Apr. 11, 2017 International Search Report issued in Patent Application No. PCT/JP2017/002632.

May 26, 2020 Office Action issued in Japanese Patent Application No. 2016-013190.

Feb. 18, 2020 Japanese Office Action issued in Japanese Patent Application No. 2016-013190.

Mar. 24, 2020 Office Action issued in European Patent Application No. 17744293.6.

Aug. 25, 2020 Notice of Termination of Reconsideration issued in Japanese Patent Application No. 2016-013190.

* cited by examiner

FIG.8

| | ROUTE A | ROUTE B | ROUTE C |
|---|---|---|---|
| CURRENT PATH SWITCHER | | | |
| CONNECTION PATTERN 1 | ○ | × | × |
| CONNECTION PATTERN 2 | × | ○ | × |
| CONNECTION PATTERN 3 | × | × | ○ |
| CONNECTION PATTERN 5 | ○ | ○ | × |
| CONNECTION PATTERN 6 | × | ○ | ○ |
| CONNECTION PATTERN 7 | ○ | × | ○ |

| PAUSE TIME | PAUSE PATTERN |
|---|---|
| TIME 1 | EVERY 1 PATTERN |
| TIME 2 | EVERY 2 PATTERNS |
| TIME 3 | EVERY 3 PATTERNS |
| ... | ... |
| TIME n | EVERY n PATTERNS |

1311

MAGNETIC FIELD FORMATION DEVICE, AND POWER RECEIVING DEVICE

TECHNICAL FIELD

The present invention relates to a magnetic field formation device forming a magnetic field at a predetermined region, and a power-receiving device.

BACKGROUND

A structure of wireless power transmission from a power feeding coil to a power-receiving coil by electromagnetic induction or magnetic field resonance has been proposed (e.g., Patent Literature 1 and Patent Literature 2).

CITATION LIST

Patent Literature

[Patent Literature 1] Japanese Unexamined Patent Publication No. 2015-144508
[Patent Literature 2] Japanese Unexamined Patent Publication No. 2013-240260

SUMMARY OF INVENTION

Technical Problem

In regard to the above, the known arrangements were done focusing on effects such as improvement in power transmission efficiency based on power transmission, and there have been no arrangements based on formation of a magnetic field at a predetermined region.

An object of the present invention is to provide a magnetic field formation device forming a magnetic field at a predetermined region, and a power-receiving device.

Solution to Problem

According to the first aspect of the invention, a magnetic field formation device configured to generate a variable magnetic field at a predetermined region includes power supplying resonators configured to generate the variable magnetic field, all of the power supplying resonators being disposed so that coil surfaces oppose the predetermined region, and at least one of the power supplying resonators being disposed to have a coil surface direction which intersects with a coil surface direction of the other power supplying resonator.

According to the second aspect of the invention, a magnetic field formation device configured to generate a variable magnetic field at a predetermined region includes power supplying resonators configured to generate the variable magnetic field, all of the power supplying resonators being disposed so that coil surfaces oppose the predetermined region, and at least one of the power supplying resonators being disposed to have a coil surface direction which is parallel to a coil surface direction of the other power supplying resonator.

In the magnetic field formation device of the first or second aspect of the invention, a variable magnetic field with high magnetic field strength or low magnetic field strength can be formed at a part of the predetermined region by adjusting the angles, locations, etc. of the coil surfaces of the power supplying resonators.

According to the third aspect of the invention, the magnetic field formation device of the first or second aspect further includes: power-supplying coils configured to generate an induced current in the power supplying resonators; and a current output controller which is configured to output a variable current to one of output targets which are at least one of and not all of the power-supplying coils and to be capable of switching the output target to which the variable current is output.

According to this arrangement, it is possible to change the magnetic field strength distribution of the variable magnetic field at the predetermined region by switching the output target of the variable current.

According to the fourth aspect of the invention, the magnetic field formation device of the third aspect is arranged such that the current output controller executes a stop process of not outputting the variable current to any of the power-supplying coils, with a predetermined combination of a timing and a duration.

With this arrangement, it is possible to easily generate a variable magnetic field with predetermined magnetic field strength in consideration of heat generation and power consumption, by adjusting the timing and duration of the stop process.

A power-receiving device of the present invention is configured to receive power by a variable magnetic field generated at a predetermined region by the magnetic field formation device of the third aspect, and includes: a power-receiving mechanism configured to receive power by the variable magnetic field; and a capacitor which has a capacity of being charged by a current received by the power-receiving mechanism and discharging at least at a minimum operating voltage of an electric part on a subsequent stage while the output target of the variable current is being switched by the current output controller.

According to this arrangement, even when an induced current cannot be obtained from the power-receiving mechanism while the output target to which the variable current is output is being switched by the current output controller, the electric part is stably driven as the capacitor performs the discharge at least at the minimum operating voltage of the electric part.

The capacitor of the power-receiving device of the present invention may have a capacity of discharging at least at the minimum operating voltage of the electric part on the subsequent stage during a stop process in which the current output controller does not output the variable current to any of the power-supplying coil.

According to this arrangement, in addition to the period during which the switching of the output target of the variable current is being performed by the current output controller, even when a current cannot be obtained from the power-receiving mechanism due to the stop process of not outputting the variable current to any of the power-supplying coils, the electric part is stably driven as the capacitor performs the discharge at least at the minimum operating voltage of the electric part.

Advantageous Effects of Invention

According to the present invention, a magnetic field which is partially a variable magnetic field with high or low magnetic field strength can be formed at the predetermined region.

BRIEF DESCRIPTION OF DRAWINGS

FIG. 8 is an explanatory diagram of operations of a current path switcher.

DESCRIPTION OF EMBODIMENTS

The following will describe an embodiment of the present invention with reference to drawings. (Magnetic Field Formation Device: Overview)

Figure 1:
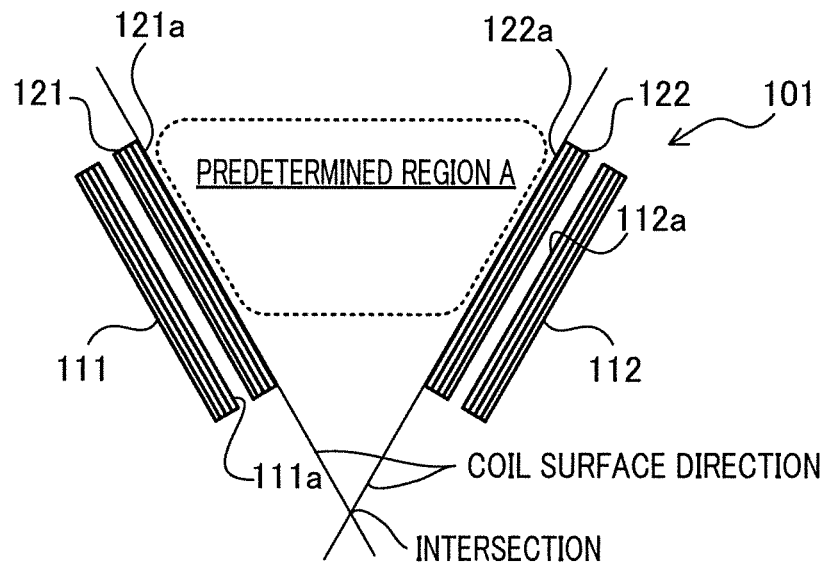
FIG. 1 is a schematic explanatory diagram of a magnetic field formation device in a front view.

As shown in FIG. 1, a magnetic field formation device 101 is configured to generate a variable magnetic field at a predetermined region A. The magnetic field formation device 101 includes power supplying resonators 121 and 122 configured to generate a variable magnetic field and power-supplying coils 111 and 112 configured to generate an induced current in the power supplying resonators 121 and 122.

All of the power supplying resonators 121 and 122 are provided so that coil surfaces 121a and 122a oppose the predetermined region A, and at least one of the power supplying resonators 121 and 122 is provided to have a coil surface direction intersecting with the coil surface direction of the other one of the power supplying resonators 121 and 122. The "coil surface direction" is a direction along a coil surface of a power supplying resonator.

In the magnetic field formation device 101 structured as described above, a variable magnetic field with high magnetic field strength or low magnetic field strength can be formed at a part of the predetermined region A by adjusting the angles, locations, etc. of the coil surfaces 121a and 122a of the power supplying resonators 121 and 122. In this way, a magnetic field which is partially a variable magnetic field with high or low magnetic field strength can be formed at the predetermined region A.

The "variable magnetic field" indicates one of (1) a magnetic field in a state in which the direction of the magnetic lines of force alternately changes between the forward direction and the reverse direction, (2) a magnetic field in a state in which the magnetic field strength changes while the direction of the magnetic lines of force is the forward direction, (3) a magnetic field in a state in which the magnetic field strength changes while the direction of the magnetic lines of force is the reverse direction, and (4) a magnetic field in a state in which two or more of the states (1) to (3) are combined.

Figure 2A:
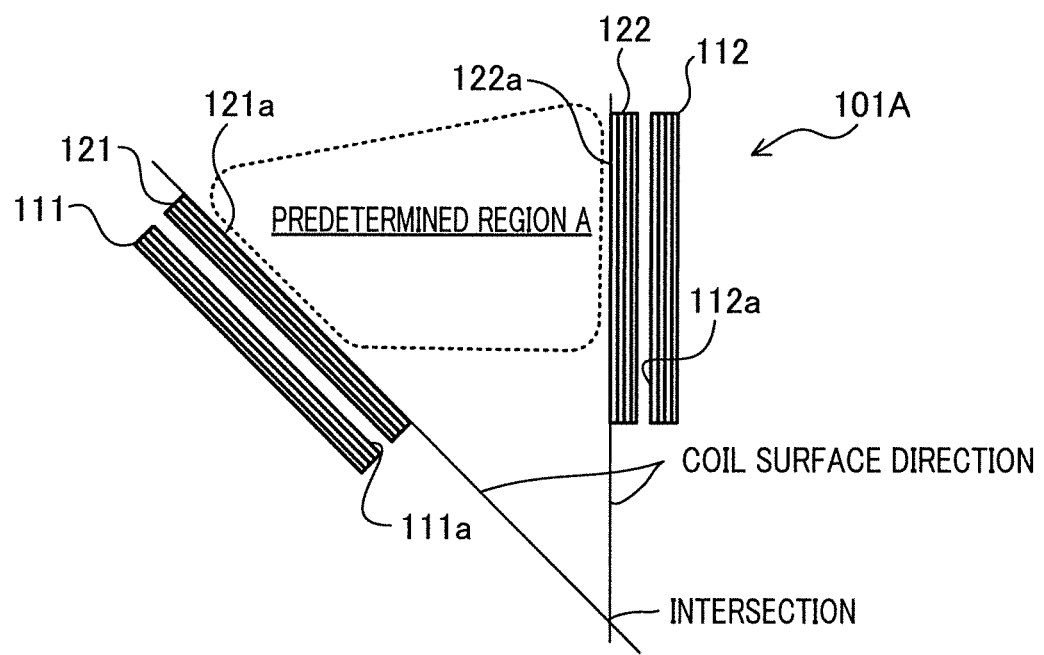
FIG. 2A is a schematic explanatory diagram of a magnetic field formation device in a front view.
Figure 2B:
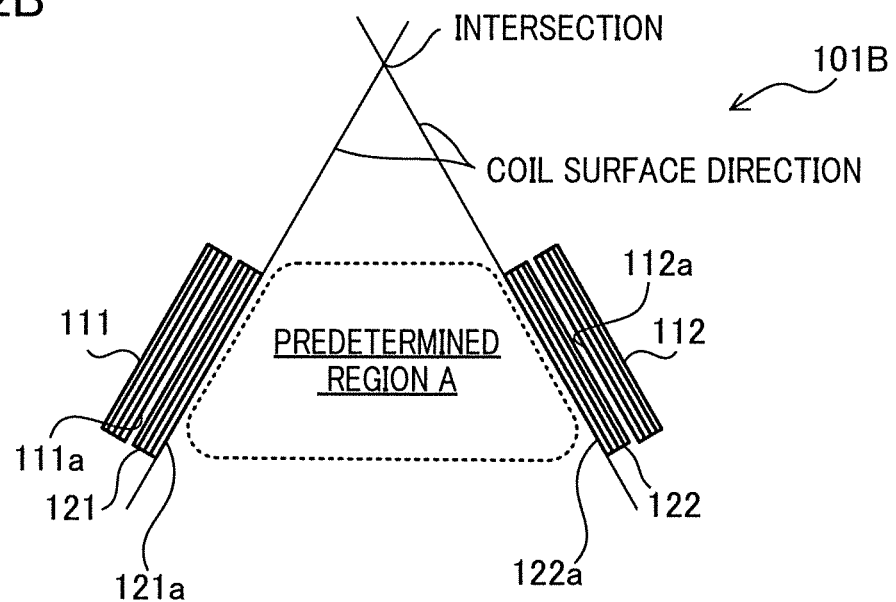
FIG. 2B is a schematic explanatory diagram of a magnetic field formation device in a front view.

The "predetermined region A" may be of any size or shape. The predetermined region A is a reverse frustum in shape, in which the lower face is smaller in diameter than the upper face. The reverse frustum shape may be a reverse circular frustum shape, a reverse square frustum shape, or an N-sided frustum shape. While in the present embodiment the predetermined region A is reverse frustum in shape, the disclosure is not limited to this arrangement. In other words, as shown in FIG. 2A, the inclination angle of at least one side face may be different from the inclination angles of the remaining side faces in the predetermined region A, or the predetermined region A may be a frustum in which the lower face is larger in diameter than the upper face as shown in FIG. 2B. The predetermined region A may be sized and shaped to correspond to an object provided in the variable magnetic field, or may be sized and shaped to correspond to a receiving space such as a container, a housing box, a room, etc. in which the object is housed. The "predetermined region A: may be a hexahedron such as a rectangular parallelepiped body, a cube, or a triangular prism.

Figure 3:
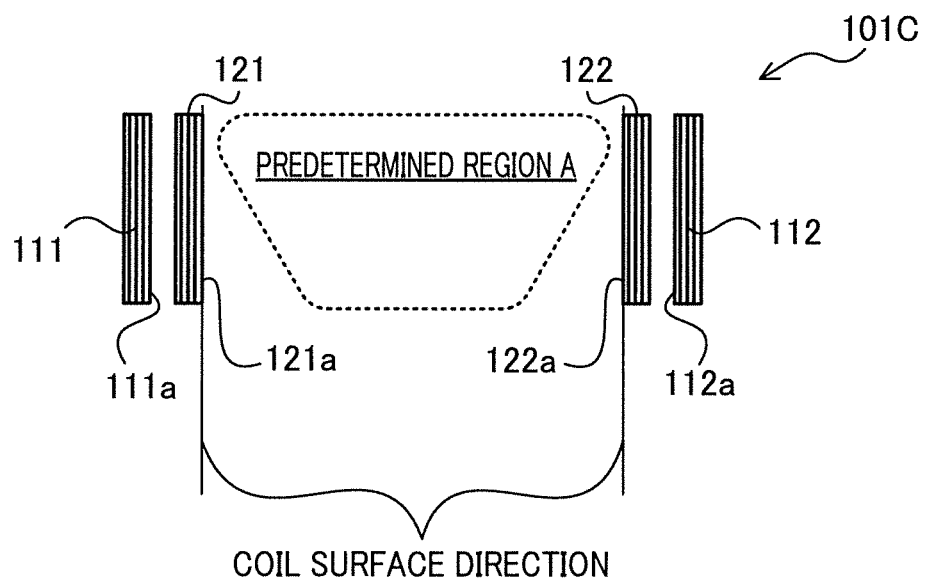
FIG. 3 is a schematic explanatory diagram of a magnetic field formation device in a front view.

Alternatively, as in a magnetic field formation device 101C shown in FIG. 3, at least one of the power supplying resonators 121 and 122 may be provided to have a coil surface direction parallel to the coil surface direction of the other one of the power supplying resonators 121 and 122. In this case, the power supplying resonators 121 and 122 may be arranged so that the coil surfaces 121a and 122a having the coil surface directions parallel to each other sandwich at least a part of the predetermined region A. Furthermore, in the case above, the power supplying resonators 121 and 122 may be disposed to at least partially overlap each other when one of the coil surfaces 121a and 122a having the coil surface directions parallel to each other is projected onto the other coil surface in the direction along the coil axis.

Alternatively, the power supplying resonators 121 and 122 may be disposed so that the coil surface 121a or 122a of at least one of the power supplying resonators 121 and 122 and the coil surface 121a or 122a of the other one of the power supplying resonators 121 and 122 are not on the same plane.

An example of the "object" is a driving device including a power-receiving device to which power is supplied by a variable magnetic field. The driving device encompasses all types of devices driven by electric power. Examples are a mobile device, a home electric appliance, and an automobile.

(Magnetic Field Formation Device: Power Supplying Resonator)

The "power supplying resonators 121 and 122" are of a spiral type, a solenoid type, or a loop type, for example, and is each a coil in which the ends of the coil are directly connected (short-circuited) to each other or indirectly connected (short-circuited) to each other by a GND or the like. All of the power supplying resonators 121 and 122 are provided so that the coil surfaces 121a and 122a oppose the predetermined region A. Furthermore, at least one of the power supplying resonators 121 and 122 is provided to have a coil surface direction intersecting with the coil surface direction of the other one of the power supplying resonators 121 and 122.

For example in case of the magnetic field formation device 101, 101A including the predetermined region A as shown in FIG. 1 and FIG. 2A, the power supplying resonators 121 and 122 are disposed along the side faces of the predetermined region A and hence the coil surface directions intersect with each other at a location below the predetermined region A. In case of the magnetic field formation device 101B including the predetermined region A as shown in FIG. 2B, the power supplying resonators 121 and 122 are disposed along the side faces of the predetermined region A and hence the coil surface directions intersect with each other at a location above the predetermined region A.

When an induced current is supplied, each of the power supplying resonators 121 and 122 generates a variable magnetic field at the predetermined region A opposing the coil surface 121a or 122a and generates a variable magnetic field at a region opposite to the predetermined region A over each of the power supplying resonators 121 and 122.

Figure 4:
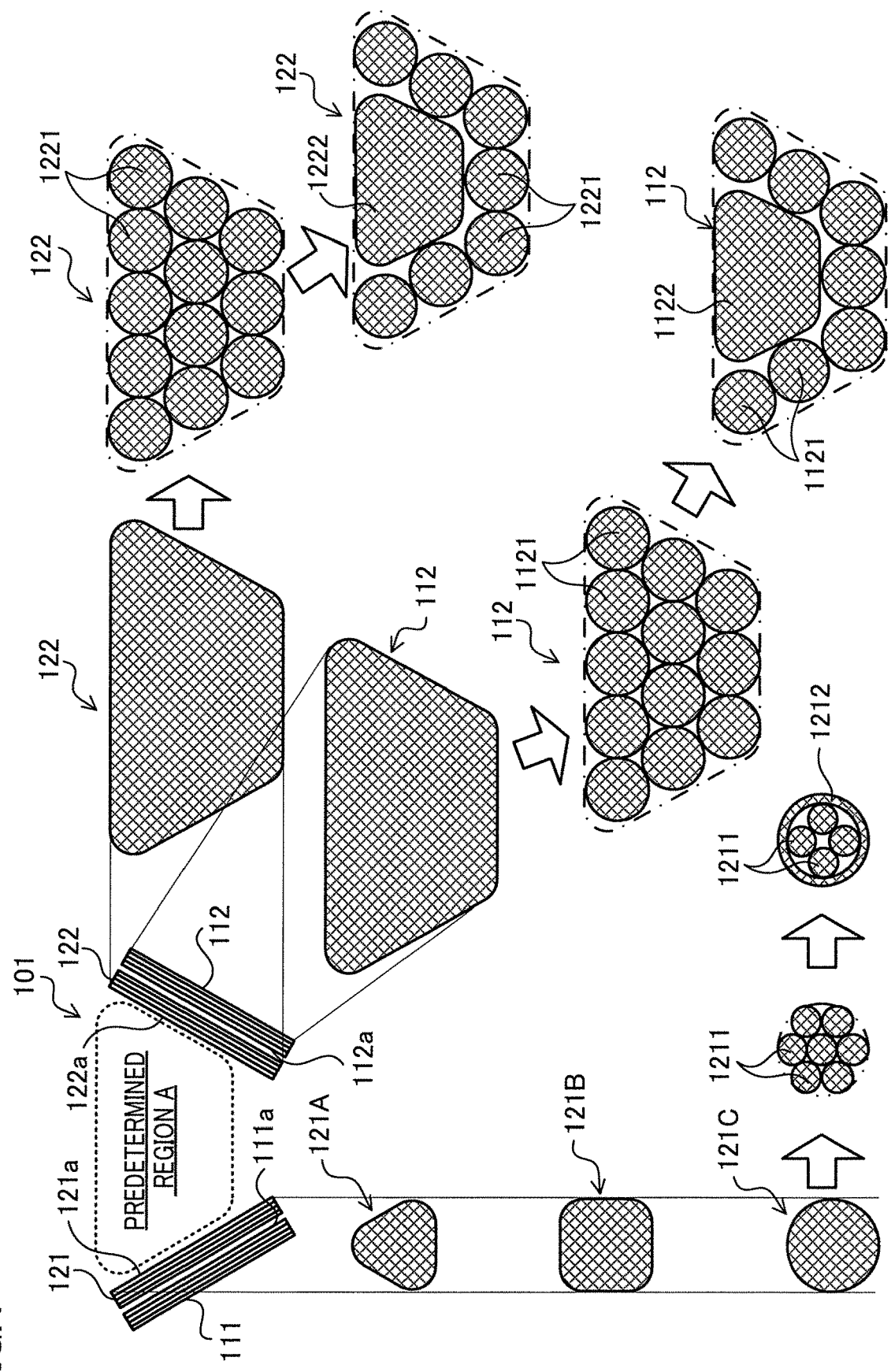
FIG. 4 is a schematic explanatory diagram of a magnetic field formation device in a front view.

The coil surfaces 121a and 122a of the power supplying resonators 121 and 122 have sizes and shapes corresponding to those of the side faces of the predetermined region A. For example, as shown in FIG. 4, the coil surfaces 121a and 122a of the power supplying resonators 121 and 122 may be trapezoidal in shape to correspond to the predetermined region A which has a reverse frustum shape, or may have another shape. To be more specific, each coil surface may be a triangular coil surface 121a as in a power supplying resonator 121A, may be a quadrangular coil surface 121a as in a power supplying resonator 121B, or may be a circular coil surface 121a as in a power supplying resonator 121C.

Alternatively, the shapes of the coil surfaces 121a and 122a of the power supplying resonators 121 and 122 may be different from each other. The shape of the coil surface of each power supplying resonator may be determined to correspond to a projected shape of a side face of the predetermined region A, or may be determined in accordance with factors such as the shapes and dispositions of the other power supplying resonator and the power-supplying coils 111 and 112. Furthermore, the power supplying resonators may be disposed so that the outer peripheries thereof partially overlap each other.

Each of the power supplying resonators 121 and 122 may be formed of plural resonator sub coils. For example, in a case of the power supplying resonator 122 which is trapezoidal in shape, a coil surface 122a which is trapezoidal in shape on the whole may be formed by gathering power supplying sub coils 1111 which are different or identical in size. Alternatively, in the power supplying resonator 122, a coil surface 122a which is trapezoidal on the whole may be formed by gathering resonator sub coils 1221 and resonator sub coils 1222 which are different in shape from the resonator sub coils 1221 and each of which is trapezoidal, for example.

Furthermore, in a case of the power supplying resonator 121C which is circular in shape, a coil surface 121a which is circular in shape on the whole may be formed by gathering power supplying sub coils 1211 which are different or identical in size. Furthermore, the power supplying resonator 121C may be formed of an annular resonator sub coil 1212 corresponding to the coil surface shape and resonator sub coils 1211 provided on the inner circumferential side of the resonator sub coil 1212. In this way, when the power supplying resonator is formed by plural resonator sub coils, it is possible to finely adjust the magnetic field strength of a variable magnetic field generated in each resonator sub coil.

(Magnetic Field Formation Device: Power-Supplying Coil)

The "power-supplying coils 111 and 112" are of a spiral type, a solenoid type, or a loop type, for example, and are coils which generate an induced current in corresponding power supplying resonators 121 and 122 on account of an externally-supplied variable current. The "variable current" indicates one of (1) a current which alternately varies to the positive side and the negative side over 0 ampere, (2) a current which varies on the positive side, (3) a current which varies on the negative side, and (4) a current in a state in which two or more of the states (1) to (3) are combined.

Each of the power-supplying coils 111 and 112 is provided to be able to generate an induced current in the corresponding power supplying resonator 121 or 122. In the present embodiment, each of the power-supplying coils 111 and 112 is provided to at least partially overlap the coil surface 121a or 122a of the corresponding power supplying resonator 121 or 122 when the coil surface 111a or 112a is projected in the direction along the coil axis. Furthermore, each of the power-supplying coils 111 and 112 is provided so that its coil surface 111a or 112a is in parallel to the coil surface 121a or 122a of the corresponding power supplying resonator 121. In this way, the coil surface directions of the coil surfaces 111a and 112a of the power-supplying coils 111 and 112 intersect with each other at a position above the predetermined region A. Alternatively, the power-supplying coils 111 and 112 may be arranged such that the coil surface directions of the coil surfaces 111a and 112a intersect with the coil surface directions of the coil surfaces 121a and 122a of the corresponding power supplying resonator 121.

As shown in FIG. 4, the coil surfaces of the power-supplying coils 111 and 112 may be sized and shaped to correspond to the shape or the like of the corresponding power supplying resonator 121. For example, the coil surfaces 111a and 112a of the power-supplying coils 111 and 112 may be trapezoidal in shape to correspond to a trapezoidal power supplying resonator 121, or may have different shapes, e.g., circular, triangular, rectangular, or polygonal. The shapes of the coil surfaces 111a and 112a of the power-supplying coils 111 and 112 may be different from each other. The coil surfaces 111a and 112a of the power-supplying coils 111 and 112 may be formed to correspond to the shapes of the corresponding power supplying resonators 121 and 122, or may be formed in accordance with factors such as the disposition of the other power-supplying coils 111 and 112 and the power supplying resonator 121.

Each of the power-supplying coils 111 and 112 may be formed of plural power supplying sub coils. For example, in the power-supplying coil 112, a coil surface 112a which is trapezoidal on the whole may be formed by gathering power supplying sub coils 1121 which are identical or different in size. Alternatively, in the power-supplying coil 112, a coil surface 112a which is trapezoidal on the whole may be formed by gathering power supplying sub coils 1121 and power supplying sub coils 1122 which are different in shape from the power supplying sub coils 1121 and each of which is trapezoidal, for example.

Figure 5:
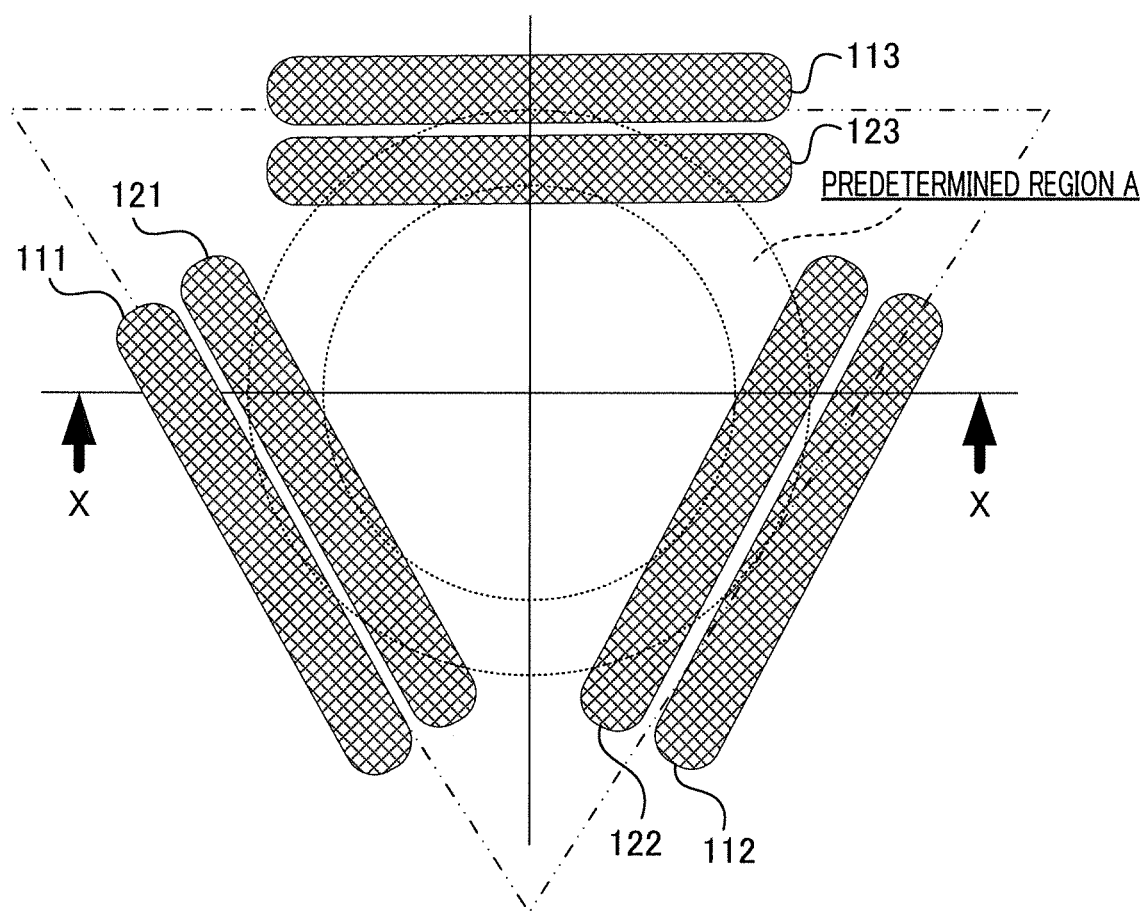
FIG. 5 is a plan view of a magnetic field formation device.

While in the explanation with reference to FIG. 1 to FIG. 3 above the magnetic field formation device 101 includes two power supplying resonators 121 and 122 for convenience of explanation, the number of the power supplying resonators is not limited to this. The number of the power supplying resonators may be variously set on condition that the number is two or more. Alternatively, for example, as shown in FIG. 5, when the predetermined region A is viewed from a point above the predetermined region A, three power supplying resonators 121, 122, and 123 may be provided along the respective sides of an equilateral triangle which is centered at the predetermined region A. In this case, the magnetic field formation device 101 includes three power-supplying coils 111, 112, and 113 corresponding to the three power supplying resonators 121, 122, and 123.

Figure 6:
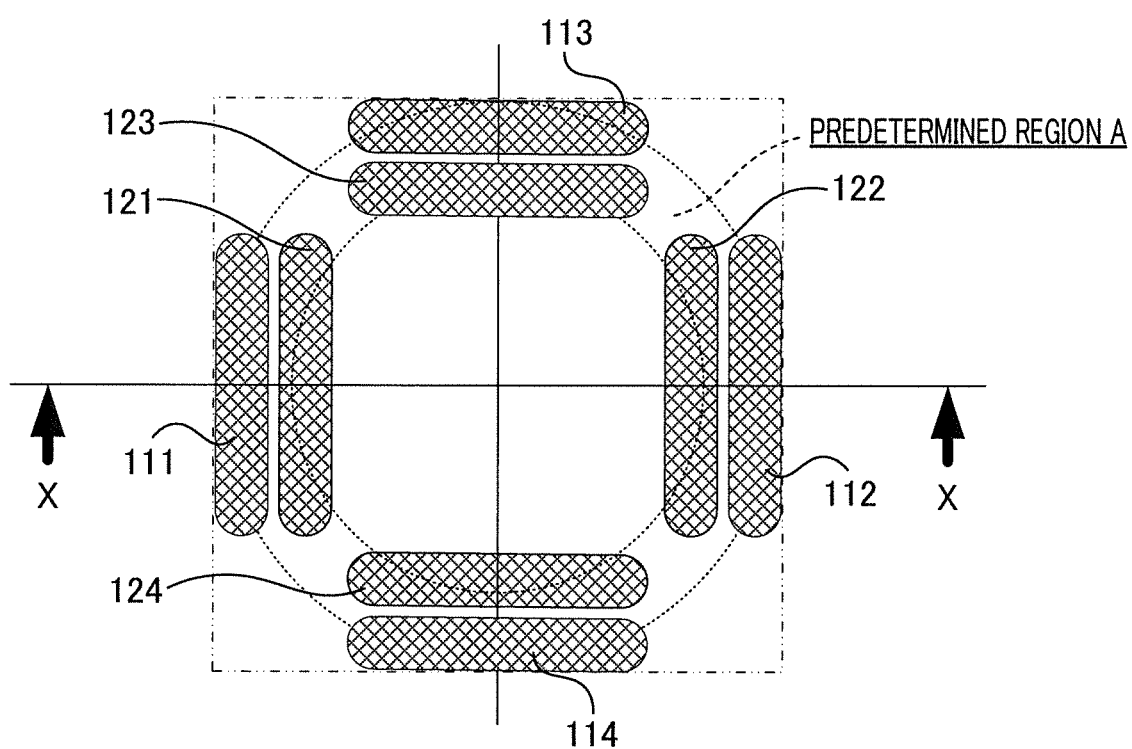
FIG. 6 is a plan view of a magnetic field formation device.

Alternatively, for example, as shown in FIG. 6, when the predetermined region A is viewed from a point above the predetermined region A, four power supplying resonators 121, 122, 123, and 124 may be provided along the respective sides of a square which is centered at the predetermined region A. In this case, the magnetic field formation device 101 includes four power-supplying coils 111, 112, 113, and 114 corresponding to the three power supplying resonators 121, 122, 123, and 124. For convenience of explanation, FIG. 5 and FIG. 6 only show cross sections of the power-supplying coils and the power supplying resonators.

While in the present embodiment the power-supplying coils are provided for the respective power supplying resonators and the number of the power-supplying coils is identical with the number of the power supplying resonators, these numbers may be different. For example, when the number of the power-supplying coils is larger than the number of the power supplying resonators, plural power-supplying coils generate an induced current for one power supplying resonator. In this case, by differentiating the power-supplying coils in shape, location, etc., it is possible to finely adjust, for example, the magnetic field strength of a variable magnetic field generated by the power supplying resonator. When the number of the power-supplying coils is smaller than the number of the power supplying resonators, one power-supplying coil generates an induced current for plural power supplying resonators.

(Magnetic Field Formation Device: Oscillation Controller)

Figure 7:
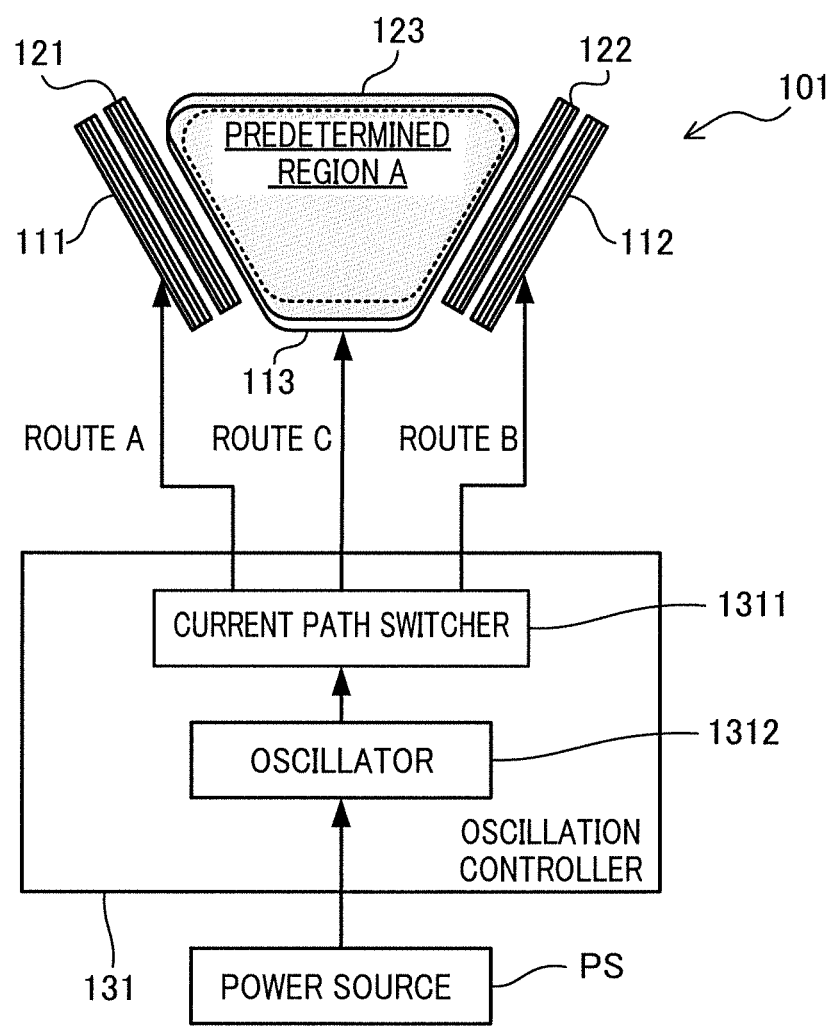
FIG. 7 is a block diagram of a magnetic field formation device.

As shown in FIG. 7, the magnetic field formation device 101 structured as described above includes the oscillation controller 131 (which is an example of a current output controller) connectable to an external power source PS. While a magnetic field formation device 101 including three power supplying resonators and three power-supplying coils will be described below, the disclosure is not limited to this arrangement.

The oscillation controller 131 includes an oscillator 1312 and a current path switcher 1311. The oscillator 1312 is connected to a power source PS and is capable of outputting a variable current. The current path switcher 1311 is configured to output a variable current of the oscillator 1312 to one of output targets which are at least one of and not all of the power-supplying coils 111, 112, and 113 and to be capable of switching the output target to which the variable current is output. The oscillation controller 131 is therefore able to change a combination of a power supplying resonator generating a variable magnetic field and a power supplying resonator not generating a variable magnetic field, by switching the output target of the variable current of the oscillator 1312 by the current path switcher 1311. As a result, it is possible to change the magnetic field strength distribution of the variable magnetic field at the predetermined region A. Furthermore, when, for example, the switching is performed at predetermined intervals (predetermined cycle), the magnetic field strength distribution of the variable magnetic field at the predetermined region A is also changed at the predetermined intervals. It is therefore possible to restrain the formation of a region where the magnetic field strength of the variable magnetic field is always high or always low in the predetermined region A. To put it differently, in the present embodiment, it is possible to repeatedly change plural magnetic field states each of which is a combination of the direction, density, and magnitude of magnetic lines of force in the variable magnetic field. With this arrangement, when, for example, the magnetic field formation device 101 is mounted on a power-supplying device, the power supply is possible without significant deterioration in the power receiving efficiency depending on the direction and position of the power-receiving device.

(Magnetic Field Formation Device: Oscillation Controller: Oscillator)

The oscillator 1312 is configured to receive a current outputted from the power source PS and is capable to outputting a variable current with any oscillating frequency. The oscillating frequency of the oscillator 1312 is preferably changeable to allow for the use of various types of magnetic field formation devices 101. Furthermore, each of the oscillating frequency, the voltage, and the current of the oscillator 1312 may be changeable in accordance with the specification of the power-supplying coil 111, 112, or 113 which is the output target.

The current output target controller is required to output a variable current to one of output targets which are at least one of and not all of the power-supplying coils and to be capable of switching the output target to which the variable current is output. The current output target controller is therefore not limited to the above-described oscillation controller 131 of the embodiment. While in the present embodiment the oscillator 1312 is indirectly connected to the power-supplying coils 111, 112, and 113 via the current path switcher 1311, the oscillator 1312 may be directly connected to the power-supplying coils 111, 112, and 113. In this case, the variable current from the oscillator 1312 can be supplied to all power-supplying coils 111, 112, and 113. Alternatively, the current path switcher 1311 may be connected to the power source PS and the oscillator 1312 may be provided on each of current paths connecting the current path switcher 1311 with the respective power-supplying coils 111, 112, and 113. In this case, the current path switcher 1311 is able to switch the power-supplying coil which is the output target of the variable current, by switching the output target of the current output from the power source PS between the three oscillators 1312 provided for the respective current paths.

(Magnetic Field Formation Device: Oscillation Controller: Current Path Switcher)

As shown in FIG. 8, the current path switcher 1311 includes a switch mechanism which is configured to switchably output the variable current of the oscillator 1312 to each of the power-supplying coils 111, 112, and 113. The switch mechanism includes plural switches. Each of these switches is switchable between connection (on-state) and disconnection (off-state) of an input end and an output end. The input ends of all switches are connected to the oscillator 1312. Meanwhile, the output ends are connected to the respective power-supplying coils 111, 112, and 113. With this arrangement, the switch mechanism supplies a variable current from the oscillator 1312 to only one of the power-supplying coils 111, 112, and 113, which is connected to a switch in the on-state.

Furthermore, the current path switcher 1311 includes a switch control mechanism. The switch control mechanism is able to switch each switch of the switch mechanism between the on-state and the off-state. For example, provided that a route through which the variable current is supplied to the power-supplying coil 111 is a route A, a route through which the variable current is supplied to the power-supplying coil 112 is a route B, and a route through which the variable current is supplied to the power-supplying coil 113 is a route C, there are six connection patterns 1 to 6. In other words, in the present embodiment, there are six output targets as an output target of the variable current from the oscillator 1312.

To be more specific, there are (1) a connection pattern 1 with which the variable current is supplied only to the power-supplying coil 111 by using only the route A; (2) a connection pattern 2 with which the variable current is supplied only to the power-supplying coil 112 by using only the route B; (3) a connection pattern 3 with which the variable current is supplied only to the power-supplying coil 113 by using only the route C; (4) a connection pattern 4 with which the variable current is supplied to the power-supplying coils 111 and 112 by using the route A and the route B; (5) a connection pattern 5 with which the variable current is supplied to the power-supplying coils 112 and 113 by using the route B and the route C; and (6) a connection pattern 6 with which the variable current is supplied to the power-supplying coils 111 and 113 by using the route A and the route C. The switch control mechanism is able to switch a combination selected from these connection patterns 1 to 6 at any timing.

In addition to the above, the switch control mechanism of the current path switcher 1311 has a function of executing a stop process of not outputting the variable current to any of the power-supplying coils 111, 112, and 113, with a predetermined combination of a timing and a duration. With this arrangement, the switch control mechanism is able to easily generate a variable magnetic field with predetermined magnetic field strength in consideration of heat generation and power consumption, by adjusting the timing and duration of the stop process.

To be more specific, the switch control mechanism is able to perform a pause operation (stop process) of stopping the power supply to all of the power-supplying coils 111, 112, and 113 by turning off all switches of the switch mechanism. In the pause operation, a pause time is selectable from plural pause times (time 1 to time n), and a suitable pause time is selected in consideration of the use and state of the magnetic field formation device 101.

In addition to the above, the switch control mechanism is able to determine a timing to execute the pause operation based on plural pause patterns. To be more specific, there are "every 1 pattern" with which the pause operation is executed each time one of the connection patterns 1 to 6 is completed, "every 2 patterns" with which the pause operation is executed each time two of the connection patterns 1 to 6 are completed, and so on. As one of these options is selected, various pause operations are executable at a desired timing.

For example, the current path switcher 1311 is able to perform a powering operation in which a route A connection state with the connection pattern 1, the pause operation, a route B connection state with the connection pattern 2, the pause operation, a route C connection state with the connection pattern 3, and the pause operation are repeated in order. Furthermore, for example, the current path switcher 1311 is able to perform a powering operation in which the route A connection state with the connection pattern 1, the route B connection state with the connection pattern 2, the route C connection state with the connection pattern 3, and the pause operation are repeated in order.

The current path switcher 1311 may be constituted by a circuit having a programmability such as a microcomputer and an operation of switching the variable current may executed by software, or may be constituted by a combination of ICs and the switching operation may be executed by hardware.

(Application Example of Magnetic Field Formation Device)

Figure 9:
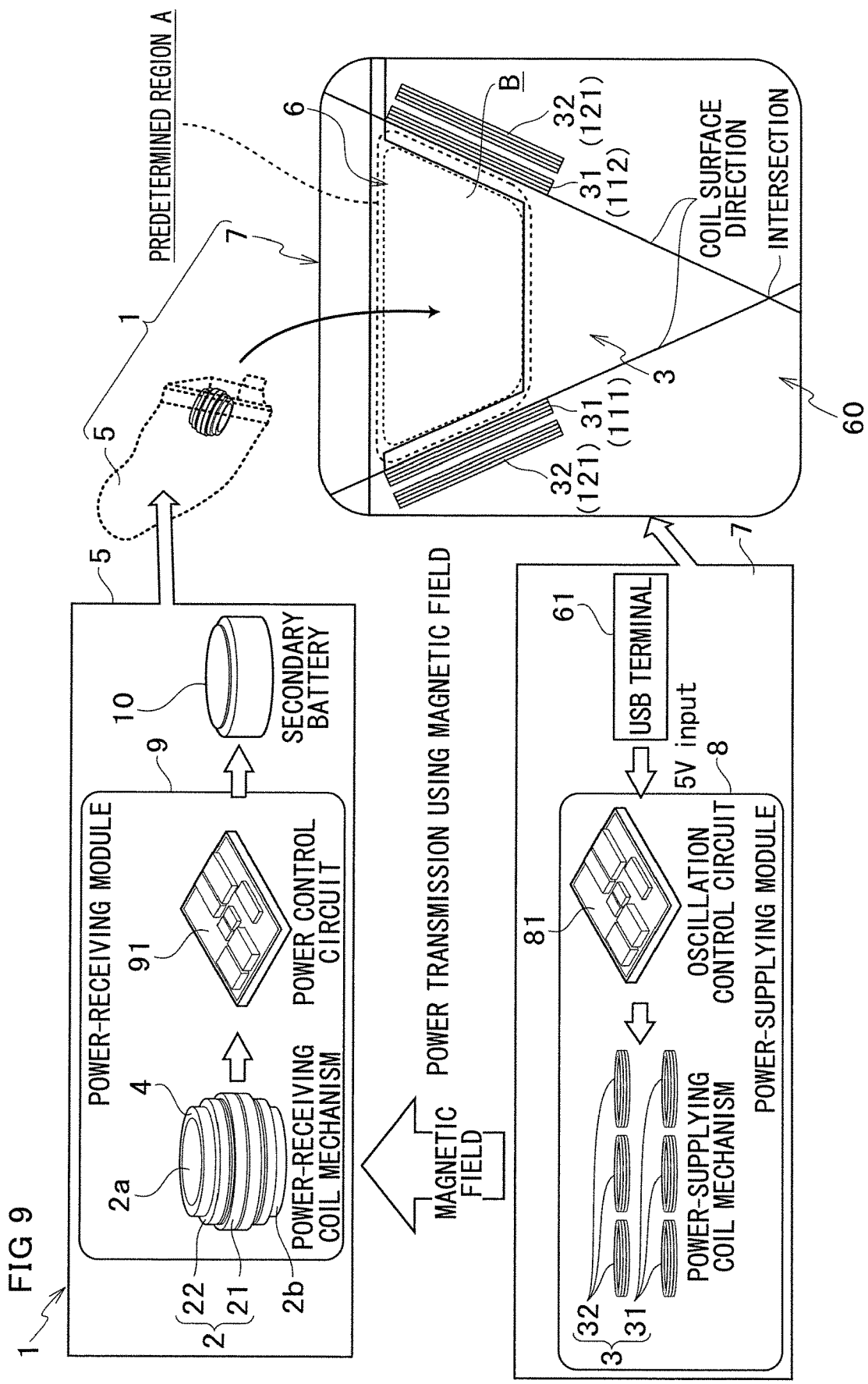
FIG. 9 is a block diagram of a power receiving/supplying device.

The following will describe a case where the magnetic field formation device 101 structured as above is used in a power-supplying device as shown in FIG. 9. To put it differently, the following will describe a case where the magnetic field formation device 101 is mounted on the charger 7 as a power-supplying device and electric power is supplied in a wireless manner to the power-receiving module 9 which is a power-receiving device of the driving device 5.

The charger 7 (power-supplying device) on which the magnetic field formation device 101 is mounted and the driving device 5 (secondary battery 10, power-receiving module 9) constitute a power receiving/supplying device 1 or a power receiving/supplying system. To put it differently, the power receiving/supplying device 1 includes the driving device 5 including the power-receiving coil mechanism 2 receiving power by a magnetic field and the charger 7 supplying power to the driving device 5 by wireless transmission.

In the power receiving/supplying device 1, the charger 7 and the driving device 5 may be treated in combination. While the description below deals with a case where the power-receiving coil mechanism 2 receives power by magnetic field resonance, the disclosure is not limited to this arrangement and it may receive power by electromagnetic induction.

(Application Example of Magnetic Field Formation Device: Charger and Housing Cup)

The charger 7 includes the housing cup 6 in which the driving device 5 such as a mobile device including a power-receiving device is mounted and the magnetic field formation device 101 which is configured to generate a variable magnetic field at the housing region B of the housing cup 6 to allow the power-receiving module 9 to receive power irrespective of the direction and position of the power-receiving module 9. The housing cup 6 may be arranged such that plural driving devices 5 are simultaneously placed at the housing region B. To put it differently, the housing region B of the housing cup 6 may have a capacity capable of simultaneously storing plural driving devices 5.

The magnetic field formation device 101 is provided in a casing of the charging case 60 in which the housing cup 6 is provided. When the magnetic field formation device 101 is employed in the charger 7, the power-supplying coils 111, 112, and 113 function as power feeding coils 31 whereas the power supplying resonators 121, 122, and 123 functions as power-supplying resonators 32. A power-supplying coil mechanism 3 including the power feeding coils 31 and the power-supplying resonator 32 is connected to an oscillation control circuit 81 which is an IC chip in which the oscillation controller 131 outputting a variable current is embodied.

The oscillation control circuit 81 and the power-supplying coil mechanism 3 are combined as a power-supplying module 8 in order to improve the handleability. The oscillation control circuit 81 is connected to a USB terminal 61. The USB terminal 61 is connectable to an unillustrated USB cable of an external device such as a personal computer provided outside the charger 7, so that 5V DC power can be supplied from the external device to the oscillation control circuit 81. Instead of the USB terminal 61, the charger 7 may be connected to a home AC power cord, and DC power converted from AC power by a rectifying circuit and a converter may be suppliable to the oscillation control circuit 81.

(Application Example of Magnetic Field Formation Device: Driving Device)

An example of the driving device 5 charged and driven by the above-described charger 7 is a mobile device. The mobile device encompasses a handheld device which can be carried on a hand and a human-wearable device which can be worn a human body. Specific examples of the mobile device include a portable computer (a laptop PC, a note PC, a tablet PC, or the like), a headset, a camera, an audio visual device (a portable music player, an IC recorder, a portable DVD player, or the like), a calculator (such as a pocket computer and an electronic calculator), a game console, a computer peripheral (a portable printer, a portable scanner, a portable modem, or the like), a dedicated information device (an electronic dictionary, an electronic notebook, an electronic book, a portable data terminal, or the like), a portable communication terminal, a voice communication terminal (a portable phone, a PHS, a satellite phone, a third party radio system, an amateur radio, a specified low power radio, a personal radio, a citizen radio, or the like), a data communication terminal (a portable phone, a PHS (a feature phone and a smart phone), a pager, or the like), a broadcasting receiver (a television receiver and a radio), a portable radio, a portable television receiver, a one-seg receiver, another type of device (a wristwatch and a pocket watch), a hearing aid, a handheld GPS, a security buzzer, a flashlight/pen light, a battery pack, and the like. Examples of the above hearing aid include an ear-hook hearing aid, an ear hole fitting hearing aid, and a glasses-type hearing aid. The driving device 5 may be a desktop device such as a personal computer.

(Application Example of Magnetic Field Formation Device: Driving Device: Power-Receiving Coil Mechanism)

The driving device 5 includes the power-receiving coil mechanism 2 which is configured to receive power by a magnetic field. In addition to the power-receiving coil mechanism 2, the driving device 5 includes: a power control circuit 91 to which power is supplied from the power-receiving coil mechanism 2; and a magnetic member 4. The power-receiving coil mechanism 2, the power control circuit 91, and the magnetic member 4 are integrated as a power-receiving module 9. The power-receiving module 9 is connected to a secondary battery 10.

The power-receiving coil mechanism 2 is configured to receive power in such a way that magnetic field resonance is caused by a variable magnetic field in the housing region B (predetermined region A). To be more specific, the power-receiving coil mechanism 2 includes a power-receiving coil 21 and a power-receiving resonator 22 provided on the inner circumferential side of the power-receiving coil 21. The "magnetic field resonance" indicates a resonance phenomenon of synchronization at a resonance frequency of a variable magnetic field. Examples of the types of coils used in the power-receiving coil 21 and the power-receiving resonator 22 include: a spiral type, a solenoid type, and a loop type. In regard to the positional relation between the power-receiving coil 21 and the power-receiving resonator 22, the power-receiving coil 21 may be provided on the inner circumferential side or the outer circumference side of the power-receiving resonator 22, or the power-receiving coil 21 and the power-receiving resonator 22 may be provided not to overlap each other in the radial direction.

The magnetic member 4 is provided on the inner circumferential side of the power-receiving coil mechanism 2. The magnetic member 4 increases the magnetic field strength by increasing the mutual inductance of the power-receiving coil mechanism 2 and increasing the magnetic flux density. As the magnetic field strength of the power-receiving coil mechanism 2 is increased by the magnetic member 4, the charging characteristic is maintained to be high in the power-receiving coil mechanism 2, and power at least at a desired level is receivable with an improved degree of freedom in the layout of the power-receiving coil mechanism 2. The power-receiving coil mechanism 2 preferably includes the magnetic member 4 but may not include the magnetic member 4.

While the positional relation between the power-receiving coil mechanism 2 and the magnetic member 4 in the axial direction, i.e., the positional relation when viewed in the direction orthogonal to the axial direction is not particularly limited, these members are preferably provided so that the power-receiving coil mechanism 2 is provided at an intermediate portion between one end side and the other end side of the magnetic member 4. This "intermediate portion" between one end side and the other end side of the magnetic member 4 indicates a part of a region sandwiched between the one end and the other end, excluding the one end and the other end.

The positional relation between the power-receiving coil mechanism 2 and the magnetic member 4 in the axial direction is further preferably arranged so that the power-receiving coil mechanism 2 is provided at a central portion between one end side and the other end side of the magnetic member 4.

The power-receiving resonator 22 of the power-receiving coil mechanism 2 is provided so that the power-receiving coil 21 is disposed on the outer circumference side. To be more specific, the power-receiving coil mechanism 2 is arranged such that the power-receiving resonator 22 is provided between the power-receiving coil 21 on the outermost circumferential side and the magnetic member 4 on the innermost circumferential side. While the positional relation between the power-receiving resonator 22 and the power-receiving coil 21 in the axial direction is not particularly limited, these members are preferably provided so that the power-receiving coil 21 is provided at an intermediate portion between one end side and the other end side of the power-receiving resonator 22. The positional relation between the power-receiving resonator 22 and the power-receiving coil 21 in the axial direction is further preferably arranged so that the power-receiving coil 21 is provided at a central portion between one end side and the other end side of the power-receiving resonator 22.

(Application Example of Magnetic Field Formation Device: Driving Device: Magnetic Member)

The magnetic member 4 is made of resin in which magnetic powder is dispersed. The resin used for the magnetic member 4 may be thermosetting resin or thermoplastic resin, and is not particularly limited. Examples of the thermosetting resin include epoxy resin, phenol resin, melamine resin, vinyl ester resin, cyano ester resin, maleimide resin, and silicon resin. Examples of the thermoplastic resin include acrylic resin, vinyl acetate based resin, and poly vinyl alcohol based resin. The present example adopts a resin whose main component is epoxy resin.

Further, soft magnetic powder is used as the magnetic powder dispersed in the resin. Examples of the soft magnetic powder include pure Fe, Fe—Si, Fe—Al—Si (sendust), Fe—Ni (permalloy), soft ferrites, Fe-base amorphous, Co-base amorphous, and Fe—Co (permendur); however, is not particularly limited. The shape of the magnetic member 4 is suitably determined, too.

(Application Example of Power Receiving/Supplying Device 1: Driving Device: Power Control Circuit)

The power control circuit 91 is mounted on a circuit substrate.

Figure 10:
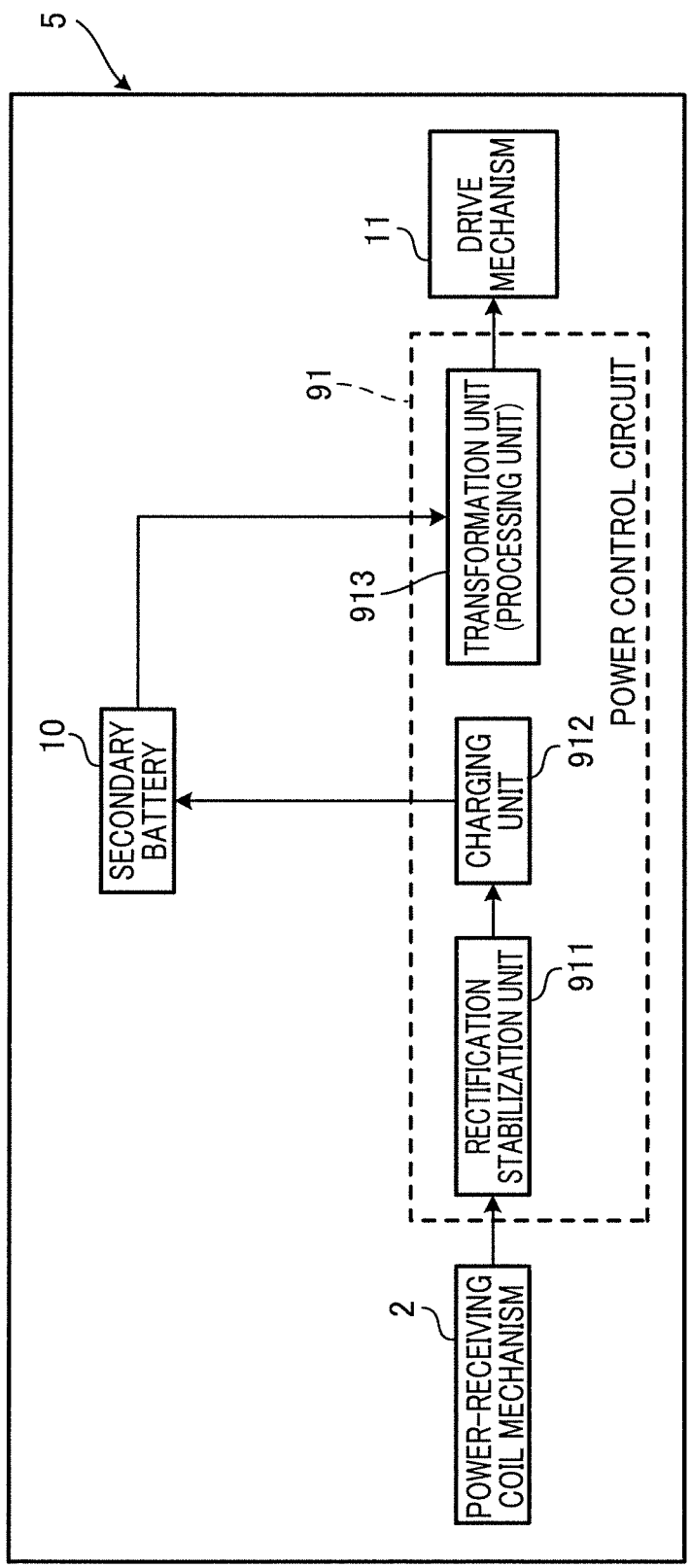
FIG. 10 is a block diagram of a driving device.

As shown in FIG. 10, the power control circuit 91 has a function of controlling the charging of the secondary battery 10. The power control circuit 91 may be a circuit further having a function of controlling the discharging.

To be more specific, the power control circuit 91 includes a rectification stabilization unit 911 which is configured to output DC power by rectifying AC power supplied from the outside via the power-receiving coil mechanism 2 outputting the DC power, a charging unit 912 configured to supply the DC power outputted from the rectification stabilization unit 911 to the secondary battery 10 at a charging voltage, and a transformation unit 913 configured to execute a signal process. The transformation unit 913 is connected to a driving mechanism 11 which is driven by the charged power of the secondary battery 10.

The rectification stabilization unit 911 is a rectification-stabilization IC, for example. The rectification-stabilization IC is an IC in which functions such as full bridge synchronous rectification, voltage conditioning and wireless power control, and protection from a voltage, current, or temperature anomaly are integrated into one chip. The rectification stabilization unit 911 may not be provided when the power outputted from the power-receiving coil mechanism 2 is DC power.

The charging unit 912 is an IC (charging circuit) for a constant current/constant voltage linear charger, and has functions such as a function of notifying that the charging current has been reduced to a predetermined setting value, a function of ending the charging using a timer, a function of stabilizing the charging current by means of thermal feedback, and a function of limiting the chip temperature in a high-power mode or in high ambient temperatures.

The transformation unit 913 is a transformer circuit which functions as a transformation unit performing signal processing of converting the charged power of the secondary battery 10 to the driving power for the driving mechanism 11 and outputting the converted power. As the transformation unit 913, a linear regulator may be employed for voltage dropping, or a switching regulator or a charge pump may be employed for voltage boosting and voltage dropping. An example of each regulator is one adopting a semiconductor elements so the current is switched on and off at a high speed.

(Application Example of Power Receiving/Supplying Device 1: Driving Device: Power Control Circuit with High-Capacitance Capacitor)

Figure 11:
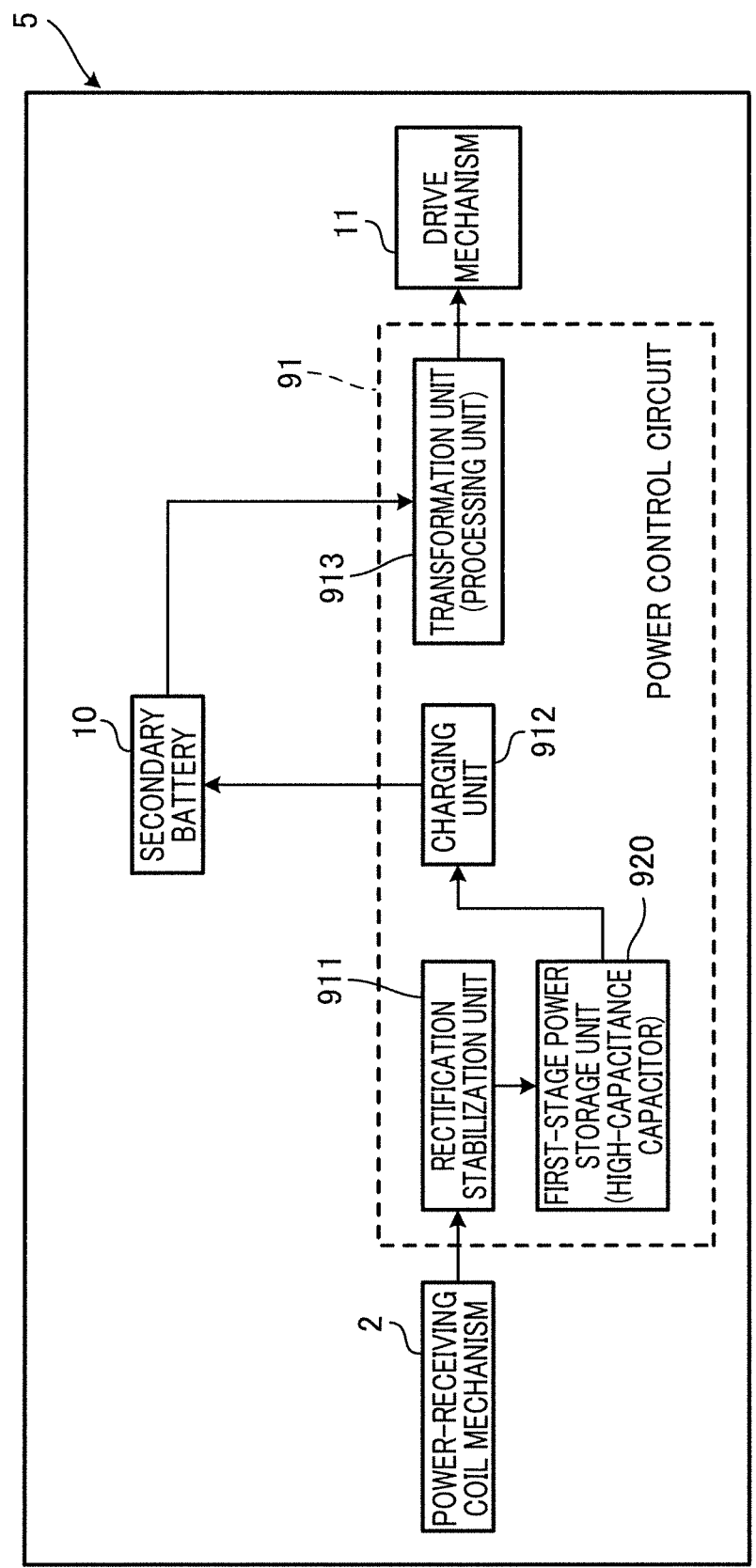
FIG. 11 is a block diagram of a driving device.
Figure 12:
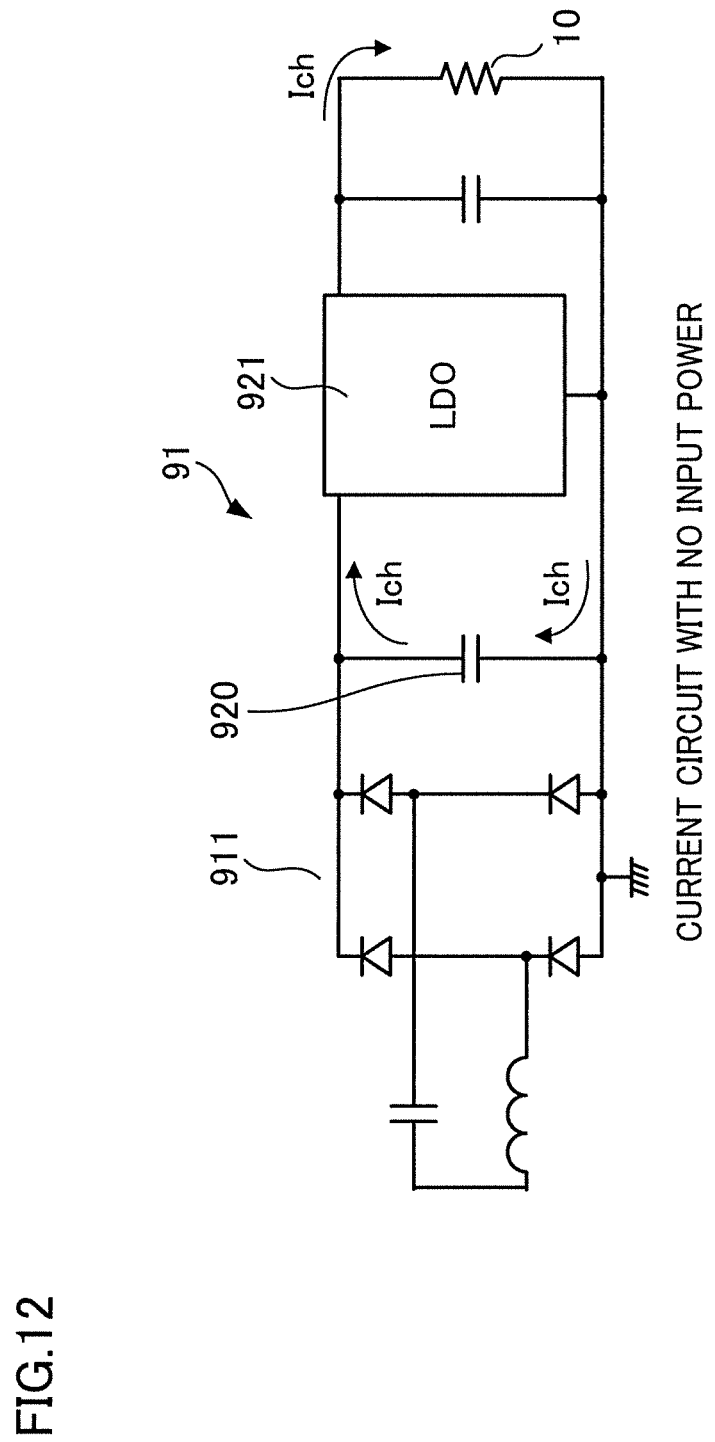
FIG. 12 is a block diagram of a driving device.

As shown in FIG. 11 and FIG. 12, the power control circuit 91 may include a high-capacitance capacitor as a first-stage power storage unit 920. The first-stage power storage unit 920 has a capacity of discharging at a voltage equal to or higher than the minimum operating voltage of an electric part on a subsequent stage, and is preferably provided in cases where a received voltage varies. The "electric part" encompasses not only a secondary battery and an electronic circuit substrate but also all driving devices driven by supplied power. The "minimum operating voltage" indicates the minimum voltage with which an electric part is properly driven. For example, the minimum operating voltage of a secondary battery is the minimum voltage with which a charging IC of the secondary battery is properly driven.

The first-stage power storage unit 920 is particularly preferable when switching of conduction to the power feeding coil 31 is performed by the current path switcher 1311 shown in FIG. 7. To be more specific, the driving device 5 (power-receiving device) including the power control circuit 91 may be configured to receive power by a variable magnetic field generated at the predetermined region A by the magnetic field formation device 101, and may include: the power-receiving coil mechanism 2 (power-receiving mechanism) configured to receive power by the variable magnetic field; and the first-stage power storage unit 920 (high-capacitance capacitor) having a capacity of being charged by a current received by the power-receiving coil mechanism 2 and discharging at least at the minimum operating voltage of the secondary battery 10, etc. (electric part) on a subsequent stage while the current path switcher 1311 is performing the switching of the output target of the variable current.

The driving device 5 may include: the power-receiving coil mechanism 2 (power-receiving device) configured to receive power by a variable magnetic field; and a capacitor having a capacity of being charged by a current received by the power-receiving coil mechanism 2 and discharging at least at the minimum operating voltage of the secondary battery 10, etc. (electric part) on a subsequent stage while the current path switcher 1311 is performing the stop process.

According to the arrangement above, even when an induced current cannot be obtained from the power-receiving coil mechanism 2 on account of the switching process or the stop process performed for the power feeding coil 31, the charging unit 912 or the like is stably driven because the first-stage power storage unit 920 performs the discharge at least at the minimum operating voltage of the charging unit 912 or the like.

The first-stage power storage unit 920 (high-capacitance capacitor) may have a capacity of discharging at least at the minimum operating voltage of an electric part on a subsequent stage during the stop process in which the current path switcher 1311 does not supply a variable current to the power feeding coil 31 (power-supplying coil). According to this arrangement, in addition to the period during which the switching of the output target of the variable current is being performed by the current path switcher 1311, even when an induced current cannot be obtained from a power-receiving coil due to the stop process for the power-supplying coil and the power supplying resonator, the electric part is stably driven as the first-stage power storage unit 920 performs the discharge at least at the minimum operating voltage of the electric part.

(Application Example of Power Receiving/Supplying Device: Driving Mechanism: Driving Device)

Examples of the driving mechanism 11 include a mechanism in which a component converting electric power to kinetic energy such as a speaker and a motor is incorporated, a light emitting mechanism or an illumination mechanism in which a component converting electric power to optical energy such as an LED light source and a laser light source is incorporated, and a microcomputer. Apart from these mechanisms, any types of mechanism driven by electric power may be used as the driving mechanism 11. The power-receiving coil mechanism 2 is configured to correspond to wireless power supply with which power supply is carried out in a mechanically contactless state. Examples of the wireless power supply include electromagnetic induction and magnetic field resonance (magnetic resonance).

(Application Example of Power Receiving/Supplying Device: Driving Device: Secondary Battery)

As the secondary battery 10, any type of batteries which are chargeable and rechargeable can be used. Examples of the secondary battery 10 include a lead storage battery, a valve-regulated lead storage battery, a lithium ion battery, a lithium ion polymer battery, a lithium iron phosphate ion battery, a lithium-sulfur battery, a lithium titanate battery, a nickel-cadmium storage battery, a nickel-hydrogen rechargeable battery, a nickel-iron battery, a nickel-lithium battery, a nickel-zinc battery, a rechargeable alkali battery, a sodium-sulfur battery, a redox flow battery, a zinc-bromine flow battery, a silicon battery, and a Silver-Zinc battery.

Although the above descriptions have been provided with regard to the characteristic parts so as to understand the invention more easily, the invention is not limited to the embodiment as described above and can be applied to the other embodiments and the applicable scope should be construed as broadly as possible. Furthermore, the terms and phraseology used in the specification have been used to correctly illustrate the present invention, not to limit it. In addition, it will be understood by those skilled in the art that the other structures, systems, methods and the like included in the spirit of the present invention can be easily derived from the spirit of the invention described in the specification. Accordingly, it should be considered that the present invention covers equivalent structures thereof without departing from the spirit and scope of the invention as defined in the following claims. In addition, it is required to sufficiently refer to the documents that have been already disclosed, so as to fully understand the objects and effects of the present invention.

REFERENCE SIGNS LIST 1 power receiving/supplying device
2 power-receiving coil mechanism
3 power-supplying coil mechanism
4 magnetic member
5 driving device
6 housing cup
7 charger
8 power-supplying module
9 power-receiving module
10 secondary battery
21 power-receiving coil
22 power-receiving resonator
31 power feeding coil
32 power-supplying resonator
111 power-supplying coil
112 power-supplying coil
121 power supplying resonator
122 power supplying resonator
131 oscillation controller
1311 current path switcher
1312 oscillator
A predetermined region
B housing region

The invention claimed is:

1. A magnetic field formation device configured to generate a variable magnetic field at a predetermined region, comprising:
    power supplying resonators configured to generate the variable magnetic field, wherein:
        all of the power supplying resonators are disposed so that coil surfaces oppose the predetermined region, and
        at least one of the power supplying resonators is disposed to have a coil surface direction which intersects with a coil surface direction of another power supplying resonator;
    power-supplying coils configured to generate an induced current in the power supplying resonators; and
    a current output controller configured to output, in a predetermined order, a variable current to output targets each of which is composed of at least one of and not all of the power-supplying coils.

2. A magnetic field formation device configured to generate a variable magnetic field at a predetermined region, comprising:
    power supplying resonators configured to generate the variable magnetic field, wherein:
        all of the power supplying resonators are disposed so that coil surfaces oppose the predetermined region, and
        at least one of the power supplying resonators is disposed to have a coil surface direction which is parallel to a coil surface direction of another power supplying resonator;
    power-supplying coils configured to generate an induced current in the power supplying resonators; and
    a current output controller configured to output, in a predetermined order, a variable current to output targets each of which is composed of at least one of and not all of the power-supplying coils.

3. The magnetic field formation device according to claim 1, wherein
    the current output controller is configured to repeatedly output the variable current to the output targets in the predetermined order.

4. The magnetic field formation device according to claim 3, wherein
    the current output controller executes a stop process of not outputting the variable current to any of the power-supplying coils, with a predetermined combination of a timing and a duration.

5. A power-receiving/supplying system comprising:
    a power supplying device including the magnetic field formation device according to claim 1; and
    a power-receiving device to which power is supplied by the variable magnetic field formed at the predetermined region by the magnetic field formation device according to claim 1, the power-receiving device comprising:
        a power-receiving mechanism configured to receive power by the variable magnetic field; and
        a capacitor which has a capacity of being charged by a current received by the power-receiving mechanism and discharging at least at a minimum operating voltage of an electric part on a subsequent stage while the output target of the variable current is being switched by the current output controller.

6. A power-receiving/supplying system comprising:
    a power supplying device including the magnetic field formation device according to claim 3; and
    a power-receiving device to which power is supplied by the variable magnetic field formed at the predetermined region by the magnetic field formation device according to claim 3, the power-receiving device comprising:
        a power-receiving mechanism configured to receive power by the variable magnetic field; and
        a capacitor which has a capacity of being charged by a current received by the power-receiving mechanism and discharging at least at a minimum operating voltage of an electric part on a subsequent stage while the output target of the variable current is being switched by the current output controller.

7. A power-receiving/supplying system comprising:
    a power supplying device including the magnetic field formation device according to claim 4; and
    a power-receiving device to which power is supplied by the variable magnetic field formed at the predetermined region by the magnetic field formation device according to claim 4, the power-receiving device comprising:
        a power-receiving mechanism configured to receive power by the variable magnetic field; and
        a capacitor which has a capacity of being charged by a current received by the power-receiving mechanism and discharging at least at a minimum operating voltage of an electric part on a subsequent stage while the output target of the variable current is being switched by the current output controller.

8. The power-receiving/supplying system according to claim 5, wherein
the capacitor has the capacity of discharging at least at the minimum operating voltage of the electric part on the subsequent stage during a stop process in which the current output controller does not output the variable current to any of the power-supplying coils.

9. The power-receiving/supplying system according to claim 6, wherein
the capacitor has the capacity of discharging at least at the minimum operating voltage of the electric part on the subsequent stage during a stop process in which the current output controller does not output the variable current to any of the power-supplying coils.

10. The power-receiving/supplying system according to claim 7, wherein
the capacitor has the capacity of discharging at least at the minimum operating voltage of the electric part on the subsequent stage during the stop process in which the current output controller does not output the variable current to any of the power-supplying coils.

11. The magnetic field formation device according to claim 2, wherein
the current output controller is configured to repeatedly output the variable current to the output targets in the predetermined order.

12. The magnetic field formation device according to claim 11, wherein
the current output controller executes a stop process of not outputting the variable current to any of the power-supplying coils, with a predetermined combination of a timing and a duration.

13. A power-receiving/supplying system comprising:
a power supplying device including the magnetic field formation device according to claim 2; and
a power-receiving device to which power is supplied by the variable magnetic field formed at the predetermined region by the magnetic field formation device according to claim 2, the power-receiving device comprising:
  a power-receiving mechanism configured to receive power by the variable magnetic field; and
  a capacitor which has a capacity of being charged by a current received by the power-receiving mechanism and discharging at least at a minimum operating voltage of an electric part on a subsequent stage while the output target of the variable current is being switched by the current output controller.

14. A power-receiving/supplying system comprising:
a power supplying device including the magnetic field formation device according to claim 11; and
a power-receiving device to which power is supplied by the variable magnetic field formed at the predetermined region by the magnetic field formation device according to claim 11, the power-receiving device comprising:
  a power-receiving mechanism configured to receive power by the variable magnetic field; and
  a capacitor which has a capacity of being charged by a current received by the power-receiving mechanism and discharging at least at a minimum operating voltage of an electric part on a subsequent stage while the output target of the variable current is being switched by the current output controller.

15. A power-receiving/supplying system comprising:
a power supplying device including the magnetic field formation device according to claim 12; and
a power-receiving device to which power is supplied by the variable magnetic field formed at the predetermined region by the magnetic field formation device according to claim 12, the power-receiving device comprising:
  a power-receiving mechanism configured to receive power by the variable magnetic field; and
  a capacitor which has a capacity of being charged by a current received by the power-receiving mechanism and discharging at least at a minimum operating voltage of an electric part on a subsequent stage while the output target of the variable current is being switched by the current output controller.

16. The power-receiving/supplying system according to claim 13, wherein
the capacitor has the capacity of discharging at least at the minimum operating voltage of the electric part on the subsequent stage during a stop process in which the current output controller does not output the variable current to any of the power-supplying coils.

17. The power-receiving/supplying system according to claim 14, wherein
the capacitor has the capacity of discharging at least at the minimum operating voltage of the electric part on the subsequent stage during a stop process in which the current output controller does not output the variable current to any of the power-supplying coils.

18. The power-receiving/supplying system according to claim 15, wherein
the capacitor has the capacity of discharging at least at the minimum operating voltage of the electric part on the subsequent stage during the stop process in which the current output controller does not output the variable current to any of the power-supplying coils.

* * * * *